US 6,515,945 B2

(12) United States Patent
Suzuki et al.

(10) Patent No.: US 6,515,945 B2
(45) Date of Patent: *Feb. 4, 2003

(54) RECORDING MEDIA LIBRARY APPARATUS WITH A FUNCTION TO DETECT A POSITION OF A RECORDING MEDIUM TRANSFERRED IN THE LIBRARY

(75) Inventors: Hiroyuki Suzuki, Kanagawa (JP); Takayuki Komiya, Kanagawa (JP); Katsumasa Yokoyama, Kanagawa (JP); Hitoshi Kimura, Kanagawa (JP)

(73) Assignee: Hitachi Electronics Engineering Co., Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/266,209

(22) Filed: Mar. 10, 1999

(65) Prior Publication Data

US 2002/0176328 A1 Nov. 28, 2002

(30) Foreign Application Priority Data

Mar. 11, 1998 (JP) ............................................. 10-078453

(51) Int. Cl.[7] ............................................. G11B 20/18
(52) U.S. Cl. .................................................. 369/30.38
(58) Field of Search ........................... 360/98.01, 98.04, 360/98.05, 98.06, 98.08, 98.12; 369/36, 75.2, 178, 191, 192, 231, 34, 53.41, 53.42, 30.51, 30.54, 30.55, 30.38, 53.1; 235/383, 384

(56) References Cited

U.S. PATENT DOCUMENTS 5,864,522 A * 1/1999 Sugano et al. ................ 369/34
5,963,514 A * 10/1999 Kanetsuku et al. ........... 369/34
5,979,755 A * 11/1999 Chaya ......................... 235/383
5,991,256 A * 11/1999 Nonada et al. ............. 369/178

FOREIGN PATENT DOCUMENTS

JP          8-87807       * 4/1996

* cited by examiner

Primary Examiner—Hoa T. Nguyen
Assistant Examiner—Tianjie Chen
(74) Attorney, Agent, or Firm—Morrison & Foerster LLP

(57) ABSTRACT

Locking claw engages a recording medium to be transferred, and a determination is made as to which of a plurality of predetermined points a current position of the locking member corresponds to. Current position of the recording medium can be determined indirectly on the basis of the thus-determined predetermined point corresponding to the current position of the locking member. If any recording medium is not properly settled in a predetermined rest position at power-ON, then the recording medium is automatically transferred to be settled in the predetermined rest position. Simplified detection of the position of the locking claw is made in absolute or quasi-absolute form, by a picker position detector unit that is provided in association with a rotating drive shaft of the locking member and employs a simply-constructed mechanism capable of generating detection pulses responsive to predetermined rotational angles of two shafts rotating at different rates. Each of the plurality of predetermined points defined for the locking claw can be identified in absolute or quasi-absolute form on the basis of a combination of patterns of the thus-generated pulses. Thus, in feed transfer of a recording medium, such as a DVD medium, the position of the medium can be detected in a simplified manner and can be automatically controlled to be properly settled in the predetermined position upon power-ON.

5 Claims, 7 Drawing Sheets

RECORDING MEDIA LIBRARY APPARATUS WITH A FUNCTION TO DETECT A POSITION OF A RECORDING MEDIUM TRANSFERRED IN THE LIBRARY

BACKGROUND OF THE INVENTION

The present invention relates generally to library apparatuses storing and handling a plurality of recording media, such as DVDs (Digital Versatile Disks) and CDs (Compact Disks), where a designated recording medium is positioned in a plurality of predetermined positions for transportation, via a carrying holder (carrier) unit, between a storage unit and a medium drive unit, and more particularly to an improved medium-positioning technique that permits accurate positioning of the designated recording medium in the predetermined positions in a highly simplified manner.

Conventionally-known recording media library apparatuses (hereinafter also referred to as "library apparatuses") are designed so that a recording medium, such as an optical disk, contained in a predetermined case or cartridge is transported automatically by a computer-controlled carrying holder unit between a storage unit and a medium drive unit and the thus-transported medium is driven via the drive unit for data read or write. Namely, such library apparatuses generally comprise the carrying holder unit automatically-controlled for retaining and transporting a designated recording medium, usually in horizontal and vertical directions, the storage unit for storing a multiplicity of the recording media in respective storage cells (or on respective storage racks), and the medium drive unit that reads or writes data on the recording medium. The carrying holder unit includes a picker mechanism which has a locking member, commonly called a locking claw or picker, engageable with the recording medium. For transfer of the designated recording medium between the holder unit and the storage unit or the drive unit, the picker mechanism drives the locking member or picker, with the recording medium locked thereby, to move the recording medium within a predetermined travel range. When, for example, the recording medium stored in a particular one of the storage cells is to be driven by the medium drive unit for data read or write, the carrying holder unit is first moved to the particular storage cell to pull the recording medium out of the storage cell into a predetermined place of the holder unit using the picker, after which the holder unit, retaining the recording medium, is moved over to the medium drive unit and sends the thus-transported medium into the drive unit using again the picker. Thus, by means of the picker, each designated recording medium can be transferred or passed between the storage cell and the carrying holder unit or between the carrying holder unit and the medium drive unit; hereinafter, such a transfer of the recording medium using the picker will be called a "feed transfer".

More and more DVDs (Digital Versatile Disks) have been used as high-density digital recording media in recent years. However, so far, there has been proposed no library apparatus capable of efficiently handling the DVD recording media.

For example, when the power supply to the conventional library apparatus is turned OFF during the course of a feed transfer of a particular recording medium, the recording medium is undesirably halted and left "pending" unsettled halfway through the intended transfer, which would lead to significant inconveniences on and after resumption of the power. Thus, in turning ON the power (at power-ON), it was absolutely necessary to properly ascertain whether or not any recording medium is left pending or unsettled halfway through a feed transfer. To this end, it has been customary for a human operator to visually ascertain the current conditions of the library apparatus and, in case any recording medium is found to be halted halfway through a feed transfer, manually move the picker out of the locking engagement with the recording medium to thereby remove the medium from the library apparatus or manually move the medium for settlement in a predetermined position.

Further, in the case where the designated recording medium is transferred through a reciprocating movement of the picker within the predetermined travel range, there would arise a need to accurately detect a current position of the picker for precise control of its movement. However, the existing general-purpose picker position detectors are relatively expensive and can never be said to be simple in structure. While the incremental pulse encoder is known today as a relatively inexpensive general-purpose detector, it is not capable of detecting absolute positions, so that if the picker is halted in a position halfway through the transfer due to power shutoff, there would be encountered the problem that the incremental pulse encoder is unable to properly perform its position detecting operation after resumption of the power.

SUMMARY OF THE INVENTION

It is therefore an object of the present invention to provide a recording media library apparatus which can properly detect a current position of a recording medium with a simple structure and thereby appropriately control transfer of the recording medium.

It is another object of the present invention to provide a recording media library apparatus which, when any recording medium is found, upon power-ON, pending halfway through a feed transfer, can automatically perform control to move and settle the pending recording medium in a predetermined position.

It is still another object of the present invention to provide a recording media library apparatus which can detect any necessary position of a picker in absolute form by means of a position detector that is inexpensive and simple in structure.

In order to accomplish the above-mentioned object, the present invention provides a recording media library apparatus which comprises: a storage section that stores a recording medium; a carrier unit that carries a recording medium; a drive unit that reads or writes data on a recording medium; a medium transfer mechanism that includes a locking member engageable with a recording medium and moves the recording medium within a predetermined travel range with the recording medium engaged by the locking member, to thereby allow the recording medium to be transferred between the carrier unit and the storage section or the drive unit; a picker position detector unit that detects a current position of the locking member to determine which of a plurality of predetermined points within the travel range the current position of the locking member corresponds to; and a controller unit that performs control to determine a current position of the recording medium within the travel range on the basis of an output of the picker position detector unit.

The recording media library apparatus of the present invention is characterized primarily in that control is performed for determining a current position of a recording medium indirectly on the basis of an output from the picker position detector unit that detects a current position of the locking member (known as a locking claw or picker in the art). This arrangement eliminates a need to provide a detector dedicated to directly detecting a current position of the recording medium within the predetermined travel range and can substantially simplify the structure of the library apparatus accordingly. As a result, the current position of the recording medium can be accurately detected with a simplified structure, which thus permits appropriate control of the library apparatus, such as medium transfer control for initializing a recording medium to a predetermined rest position at power-ON, control for properly positioning a recording medium for transportation between the carrier unit and the storage section or the drive unit.

In a preferred implementation of the present invention, the controller unit controls transfer of the recording medium by the medium transfer mechanism on the basis of the output of the picker position detector unit, to allow the recording medium to be properly placed or settled in a predetermined rest position. The predetermined rest position in the present invention is where the recording medium is completely stored in any one of the carrier unit, storage section and drive unit, rather than being pending or unsettled halfway between the carrier unit and the storage section or the drive unit. Thus, in cases where the present invention is applied to the medium transfer control for initialization of a recording medium position at power-ON, the controller unit, at power-ON (i.e., turning-ON of the power to the apparatus), determines on the basis of the output from the picker position detector unit whether or not the recording medium is properly placed in the predetermined rest position. If the recording medium is unsettled or pending halfway through an intended transfer, i.e., if the recording medium is not in the predetermined rest position, the controller unit can automatically adjust the position of the recording medium for proper settlement in the predetermined rest position. Consequently, even in the case where, upon power-ON, any recording medium is found unsettled or pending halfway through an intended transfer, the recording medium can be automatically moved, under the control of the controller unit, to the predetermined rest position, so as not to prevent the library apparatus from starting its operation properly. This allows the library apparatus to efficiently start working, without a need for any prior manual operation by a human operator as discussed above.

For more efficient operation, the recording media library apparatus may include a plurality of storage sections disposed to the opposite sides of the carrier unit with the drive unit disposed to either one of the two sides. In such a case, the recording media can be fed horizontally to and from the carrier unit in the opposite directions; that is, leftward and rightward feed transfers of recording media are permitted. Thus, it would be more convenient if each recording medium is constructed to be engaged by the locking member selectively at one of different portions depending on whether the intended feed transfer is leftward or rightward. In this case, however, the positional relationship between the locking member and the recording medium has to differ between the leftward feed and the rightward feed. Taking this into account, it is preferable that the library apparatus according to the present invention further comprise a detecting section for detecting any recording medium pending or unsettled halfway between the carrier unit and the storage section or the drive unit, and that the controller unit control the transfer of the recording medium by the medium transfer mechanism on the basis of respective outputs of the detecting section and the above-mentioned picker position detector unit to allow the recording medium to be placed or settled properly in the predetermined rest position. Namely, because the detecting section allows the leftward and rightward feed transfers to be distinguished from each other, the recording medium can be properly controlled to be settled in an appropriate rest position.

In a preferred implementation, the above-mentioned picker position detector unit is provided in association with a drive shaft for the locking member of the medium transfer mechanism, and the picker position detector unit includes at least one transmission shaft to which rotational force of the drive shaft is transmitted at a predetermined transmission ratio, and a plurality of sensor sections provided in corresponding relation to at least the drive shaft and the transmission shaft, each of the sensor sections generating a rotational position detection signal corresponding to at least one predetermined rotational angle of a corresponding one of the shafts while the corresponding shaft is rotating. The picker position detector unit detects the plurality of predetermined points in absolute form on the basis of a combination of generation patterns of the rotational position detection signals generated by the sensor sections. In this arrangement, there occurs a predetermined difference between the rotating angles of the drive and transmission shafts, so that a combination of the rotating angle patterns of the individual shafts can correspond to a current absolute position of the locking member. As a consequence, each of the predetermined points defined for the locking member can be identified, in absolute values or form, on the basis of a combination of the generation patterns of the rotational position detection signals, corresponding to the individual shafts, output from the sensor sections. Because the sensor sections each may be of a simple structure which can only generate a rotational position detection signal responsive to at least one predetermined rotational angle of the corresponding shaft, they can be extremely simpler in structure and inexpensive as compared to the existing general-purpose absolute encoders. Therefore, the present invention can provide a more sophisticated recording media library apparatus which is capable of detecting any necessary positions with such a picker position detector unit that is very inexpensive and simple in structure.

Further, in a preferred implementation, the controller unit performs control for placing or settling any "pending" recording medium in the predetermined rest position upon power-ON, and also includes an initialization control that, after the recording medium is thus settled in the predetermined rest position, initializes the medium transfer mechanism in such a way that the locking member disengages from or release the recording medium and is then positioned at a predetermined reference point. Namely, at power-ON, the controller unit automatically ascertains the current position of the recording medium left pending after the power-OFF or power shutoff, settles the medium in any one of the storage section, carrier unit and drive unit and then positions the locking member at the predetermined reference point. Thus, even when the power was turned OFF during the course of a feed transfer of a recording medium with the medium left engaged by the locking member, the initialization control, upon following power-ON of the library apparatus, can automatically initialize both the recording medium and the locking member to respective appropriate positions, with the result that the library apparatus can work with increased efficiently.

Every time the locking member is found left in engagement with a recording medium with at least part of the medium received in the carrier unit when the operation is to be performed, upon power-ON, for positioning the locking member at the predetermined reference point, the recording medium is first transferred into a predetermined place of the carrier unit and the locking member is retracted out of the engagement with the medium, after which the control is performed for moving the locking member to the predetermined reference point. To this end, the recording media library apparatus may further comprise a detecting section that detects any recording medium pending or unsettled between the carrier unit and storage section or drive unit. The controller unit may control the transfer of the recording medium by the medium transfer mechanism on the basis of respective outputs of the detecting section and the picker position detector unit to allow the recording medium to be properly settled in the predetermined rest position. In this case, it is preferable that the predetermined rest position be where the recording medium is completely stored in any one of the carrier unit, storage section and drive unit. Because, in the case where there is any recording medium pending or unsettled between the carrier unit and storage section or drive unit, it is very likely that another recording medium is received in the storage section or drive, although no other recording medium, than the pending recording medium, is present in the carrier unit. Therefore, if the pending recording medium is fed to the storage section or drive unit that may contain another recording medium, there is a chance of these media colliding against each other. To avoid such an inconvenience, whenever at least part of the medium is found received in the carrier unit at turning-ON of the power to the library apparatus, the pending recording medium is first fed to the carrier unit so that it is temporarily positioned completely within the carrier unit.

The present invention also provides a recording media library apparatus which comprises: a storage section that stores a recording medium; a carrier unit that carries a recording medium; a drive unit that reads or writes data on a recording medium; a medium transfer mechanism that transfers the recording medium between the carrier unit and the storage section or the drive unit; a detecting section that detects any recording medium pending halfway between the carrier unit and the storage section or the drive unit; and a controller unit that, when the detecting section detects the recording medium at turning-ON of the power to the recording media library apparatus, controls the medium transfer mechanism to transfer the recording medium into a predetermined place of the carrier unit.

When the power is shut off during the course of a feed transfer (handling) of a recording medium by the carrier unit, the medium would be halted and left pending halfway between the carrier unit and the storage section or the drive unit as mentioned earlier. If, at following turning-ON or restoration of the power, the carrier unit is moved in the vertical direction or the locking member is returned to a predetermined reference point while still engaging the pending recording medium without executing any appropriate positional initialization of the medium, the medium projecting from the carrier unit would collide against another mechanism in the library apparatus or would be displaced by the locking member returning to the reference point to collide against another recording medium stored in the storage section. However, according to the present invention, such problems can be effectively avoided by the provision of the detecting section detecting any recording medium pending or unsettled between the carrier unit and the storage section or the drive unit and by the positional initialization control to automatically position the pending recording medium in the predetermined place of the carrier unit.

According to the present invention, each recording medium may be feed-transferred by the medium transfer mechanism and transported by the carrier unit, along with a predetermined tray-like mount or base supporting thereon the recording medium. By so doing, the present invention can be implemented as a DVD library apparatus. Namely, where each recording medium is disk-shaped like a DVD or CD medium and can not be directly engaged by the locking member for the transfer purpose, such a recording medium is supported on a separate tray-like mount or base (carrying tray) and transported along with the mount; in this case, the locking member engages the mount, rather than the recording member itself. Alternatively, the mount may be in the form of a cartridge or the like.

BRIEF DESCRIPTION OF THE DRAWINGS

For better understanding of the object and other features of the present invention, its preferred embodiments will be described in greater detail hereinbelow with reference to the accompanying drawings, in which.

DETAILED DESCRIPTION OF THE PREFERRED EMBODIMENTS

Figure 1:
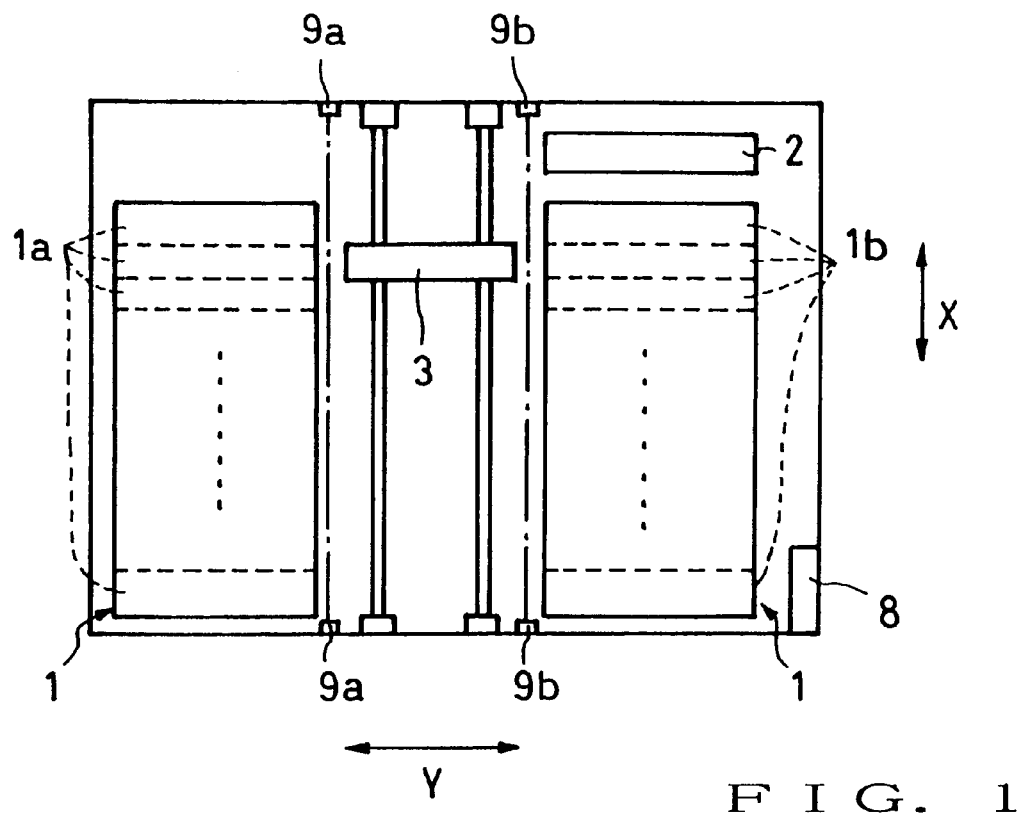
FIG. 1 is a side view schematically showing an exemplary general organization of a recording media library apparatus in accordance with an embodiment of the present invention.

FIG. 1 is a side view schematically showing an exemplary general organization of a recording media library apparatus in accordance with an embodiment of the present invention, and this embodiment is illustrated here as storing and handling DVD recording media.

In FIG. 1, the library apparatus includes a carrying holder (carrier) unit 3 for transporting a designated recording medium in the library apparatus, two storage units 1 having a plurality of storage cells 1a and 1b, and a medium drive unit 2 for reading or writing data on the recording medium. Various operations in the entire library apparatus are carried out under the control of a controller unit 8, which may be a microcomputer including a MPU (Microprocessor Unit), ROM (Read-Only Memory) and RAM (Random Access Memory). Designated recording medium is transported between the storage unit 1 and the drive unit 2 by the carrying holder unit 3 moving in the vertical direction (denoted by arrow X) via a so-called "elevator" mechanism (not shown).

Figure 2:
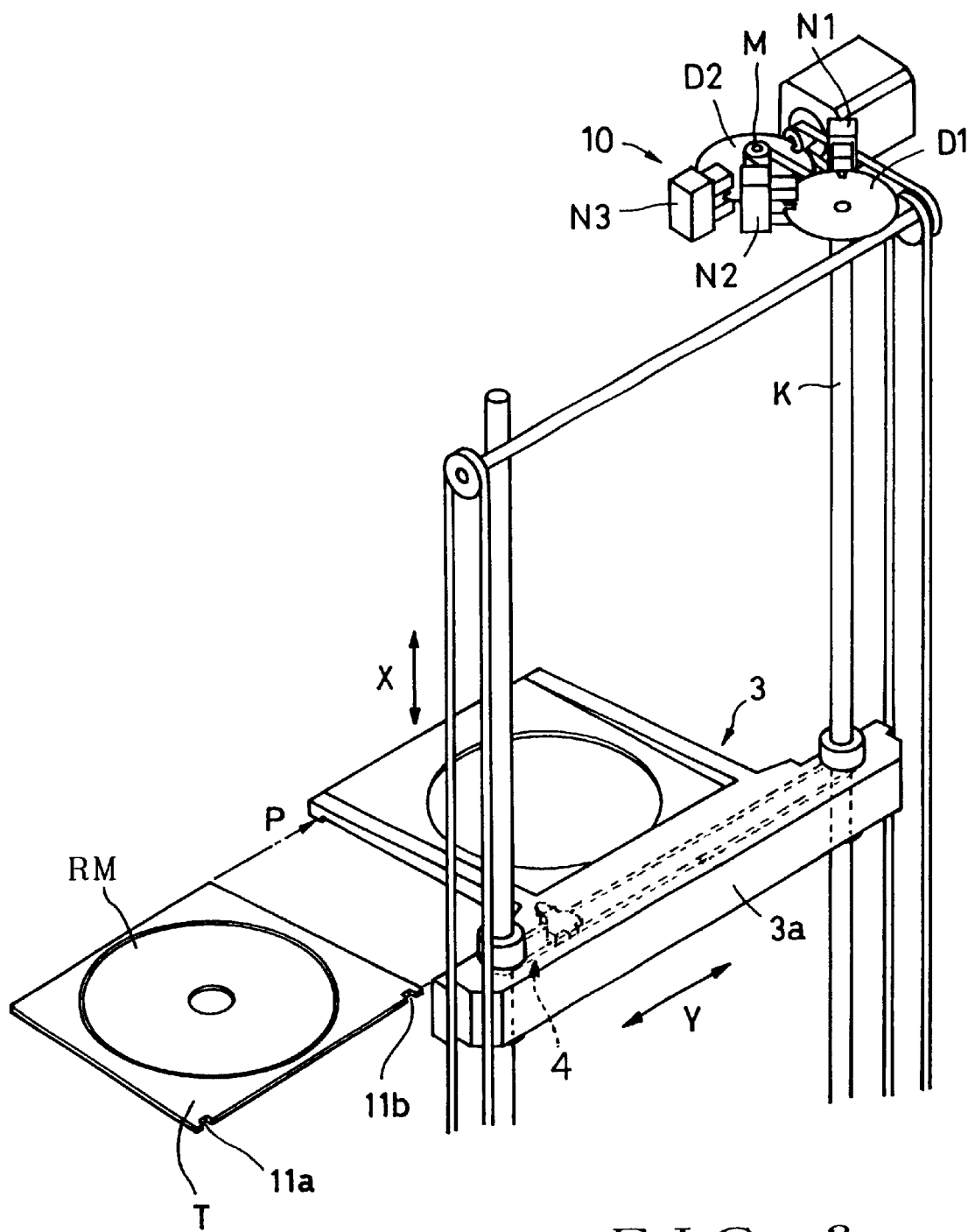
FIG. 2 is an enlarged perspective view of a carrying holder unit in the recording media library apparatus of FIG. 1.

FIG. 2 is an enlarged perspective view of the carrying holder unit 3 of FIG. 1. The carrying holder unit 3 is designed to pull a tray T, supporting thereon the DVD recording medium RM, in a direction of arrow P so that the medium RM is held within a predetermined retaining place of the holder unit 3. For a horizontal transfer of the tray T into and out of the carrying holder unit 3, the holder unit 3 includes a picker mechanism 4 in its predetermined portion 3a, and this picker mechanism 4 is movable along with the body of the holder unit 3 in the vertical or arrow-X direction as shown in FIGS. 2, 3 and 4.

Figure 3:
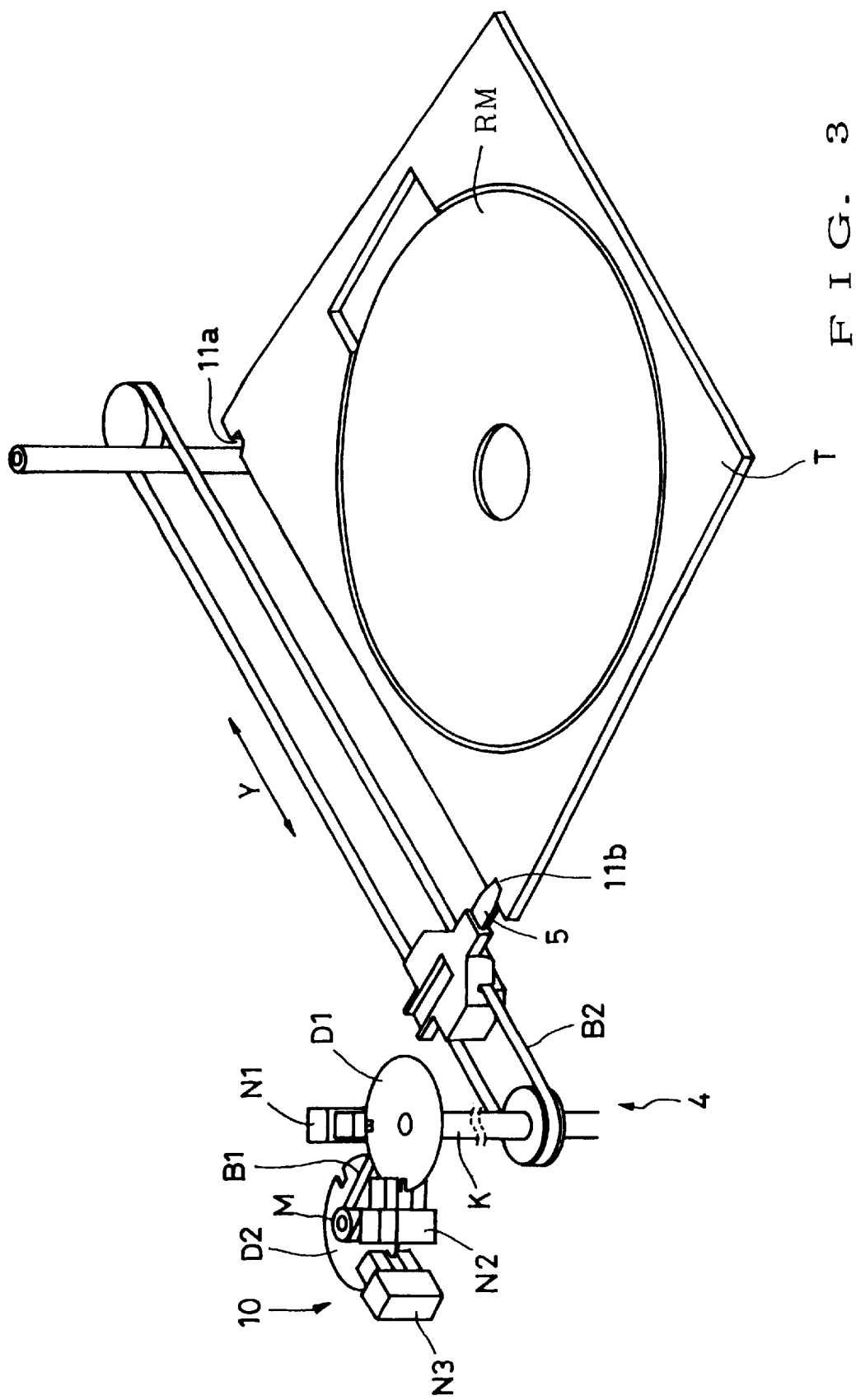
FIG. 3 is a perspective view of a picker mechanism and a picker position detector unit provided in the carrying holder unit.
Figure 4:
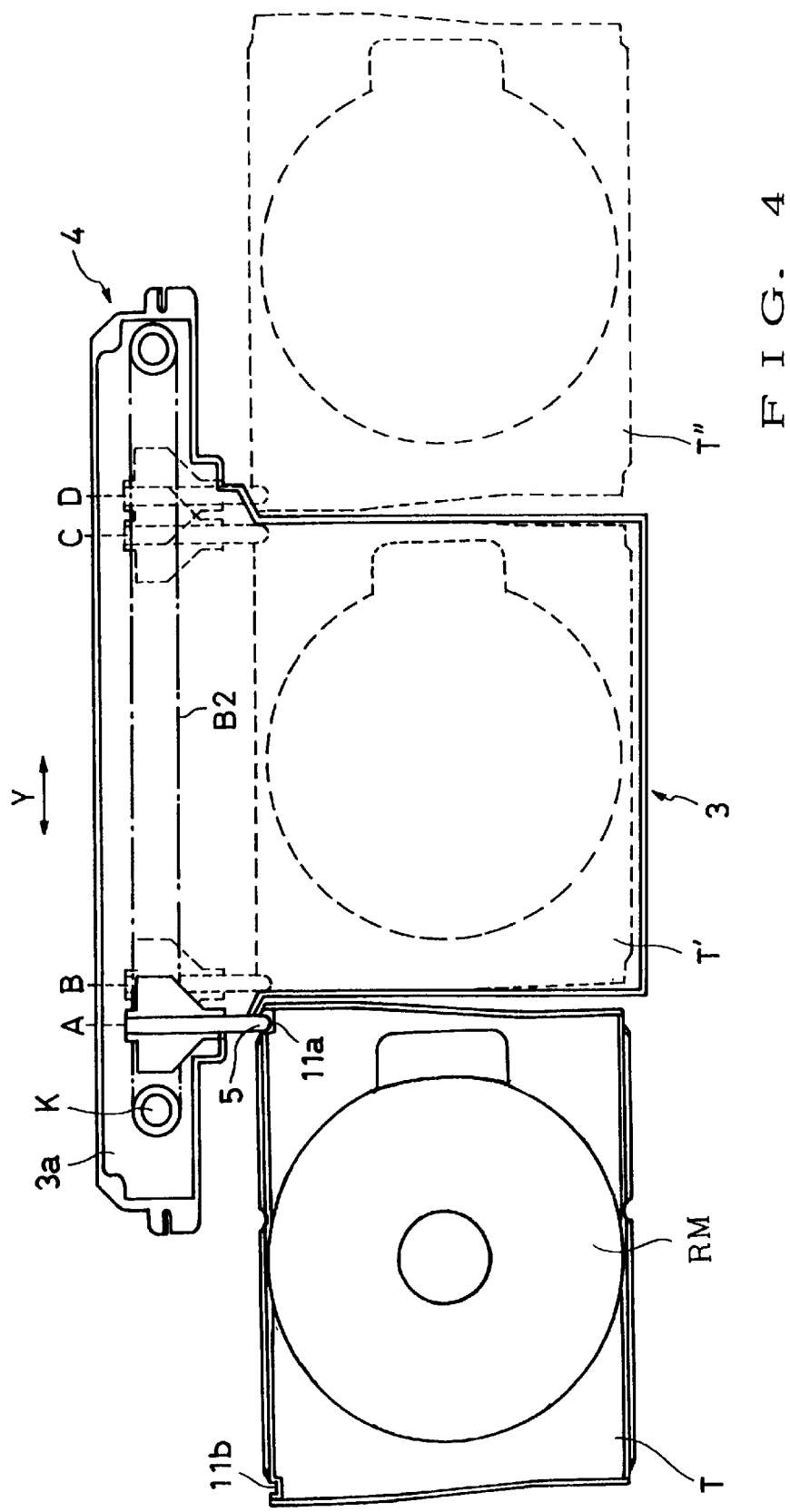
FIG. 4 is a plan view explanatory of how a recording medium supported on a tray is transferred and positioned in predetermined rest positions by means of the picker mechanism.

FIG. 3 shows the tray T as brought into the predetermined retaining place of the carrying holder unit 3 and the picker mechanism 4, where illustration of the holder unit 3 itself is omitted for clarity. Note that the term "recording medium" will sometimes refer to a combination of the recording medium itself and the tray T, since the combination is handled together by the holder unit 3 in the described application.

The picker mechanism 4 includes a locking member 5 in the form of a picker claw (hereinafter referred to as a locking claw) that is engageable with a predetermined portion of the tray T as stated below. The medium RM and tray T are together transferred within a predetermined horizontal travel range by reciprocatively moving the locking claw 5, in engagement with the tray T, in the horizontal direction denoted by arrow Y; thus, the medium RM and tray T can be together passed between the holder unit 3 and the storage unit 1 or the medium drive unit 2. The tray T has, in its one edge, two similar recesses (commonly called "pick notches" in the art) 11a and 11b for engagement by the locking claw 5. Namely, the locking claw 5 is controlled to move between an extended or "pick-in" position for engaging with one of the recesses or pick notches 11a, 11b and a retracted or "pick-out" position for disengaging from the recess 11a, 11b. The locking claw 5 is designed in such a way that when the power supply to the library apparatus is turned OFF while the locking claw 5 is working in the pick-in position, it is left held in the pick-in position, although not described in detail here.

As shown in FIG. 1, the storage units 1 and medium drive unit 2 are disposed adjacent to opposite sides of the carrying holder unit 3 so that the recording media can be fed horizontally to and from the holder unit 3 in the opposite directions. That is, the holder unit 3 is of a so-called "bidirectional accessing" type which is arranged to have access to the media located to the opposite sides of the holder unit 3; stated otherwise, the feed transfer to and from the holder unit 3 can be carried out in leftward and rightward directions. This is why the tray T has the two similar recesses or pick notches 11a, 11b in its opposite end portions along the one edge closer to the holder unit 3; that is, the pick notch to be engaged by the locking claw 5 can be changed depending on whether the instructed feed transfer is leftward or rightward.

FIGS. 3 and 4 show the example where the locking claw 5 is moved in the horizontal or arrow-Y direction by an endless belt. Specifically, FIG. 4 is explanatory of the leftward feed and rightward feed by the picker mechanism 4. The tray T denoted by solid line is in a first predetermined rest position to the left of the holder unit 3. Solid line T' denotes the tray placed in a second predetermined rest position centrally within the holder unit 3, and solid line T'" denotes the tray in a third predetermined rest position to the right of the holder unit 3. In FIG. 4, the locking claw 5 of the picker mechanism 4 is reciprocatively moved within a predetermined range between predetermined points A and D.

In the case of the leftward feed transfer, the locking claw picker 5 is caused to project into engagement with one of the recesses (recess 11a in the illustrated example) of the tray T and move in the horizontal direction between the predetermined points A and C of FIG. 4. When the locking claw 5 is in engagement with the recess 11a at the point A, the tray T lies in the first predetermined rest position, and when the locking claw 5 is in engagement with the recess 11a at the point C, the tray T lies in the second predetermined rest position.

Similarly, in the case of the rightward feed transfer, the locking claw picker 5 is caused to project into engagement with the other recess (recess 11b in the illustrated example) of the tray T and move in the horizontal direction between the predetermined points B and D of FIG. 4. When the locking claw 5 is in engagement with the recess 11b at the point B, the tray T lies in the second predetermined rest position, and when the locking claw 5 is in engagement with the recess 11b at the point D, the tray T lies in the third predetermined rest position.

Referring back to FIG. 1, the recording media library apparatus also includes medium detectors 9a and 9b for detecting any recording medium RM "pending" halfway between the holder unit 3 and the storage unit 1 or the drive unit 2. The leftward and rightward feed transfers can be distinguished from each other by just determining which of the medium detectors 9a, 9b has detected such a pending recording medium RM.

As shown in FIGS. 2, 3 and 4, the locking claw 5 of the picker mechanism 4 is movable in the horizontal or arrow-Y direction by means of a motor shaft M rotated by a motor (not shown), a drive shaft K rotated by rotational force of the motor shaft M delivered thereto at a predetermined transmission ratio and an endless belt B2 driven by the drive shaft K to run in the horizontal or arrow-Y direction. The locking claw 5 is secured to a predetermined position of the belt B2 so that it can move either leftward or rightward by the rotation of the above-mentioned shafts.

Picker position detector unit 10 is also provided to detect a current position of the locking claw 5 and determine which of the predetermined points A, B, C and D within the reciprocating range the detected current position of the locking claw 5 corresponds to. In the illustrated example, this picker position detector unit 10 includes two slitted disks D1 and D2 mounted on the drive shaft K and motor shaft M, respectively, and three optical sensors N1 to N3. Each of the slitted disks D1 and D2 has one or more slits formed therein which correspond to one or more predetermined rotational angles of the corresponding shaft. As the drive shaft K and motor shaft M rotate, the optical sensors N1 and N2 detect the slits in the disk D1 while the optical sensor N3 detects the slits in the other disk D2. Note that the optical sensors N1 and N2 are spaced apart from each other by a predetermined distance along the circumference of the disk D1. In this way, the three optical sensors N1, N2 and N3 generate, in predetermined patterns, rotational position (or slit) detection pulse signals n1, n2 and n3, respectively, indicative of detected rotational positions of the disks D1 and D2, which correspond to a current position of the locking claw 5.

Figure 5:
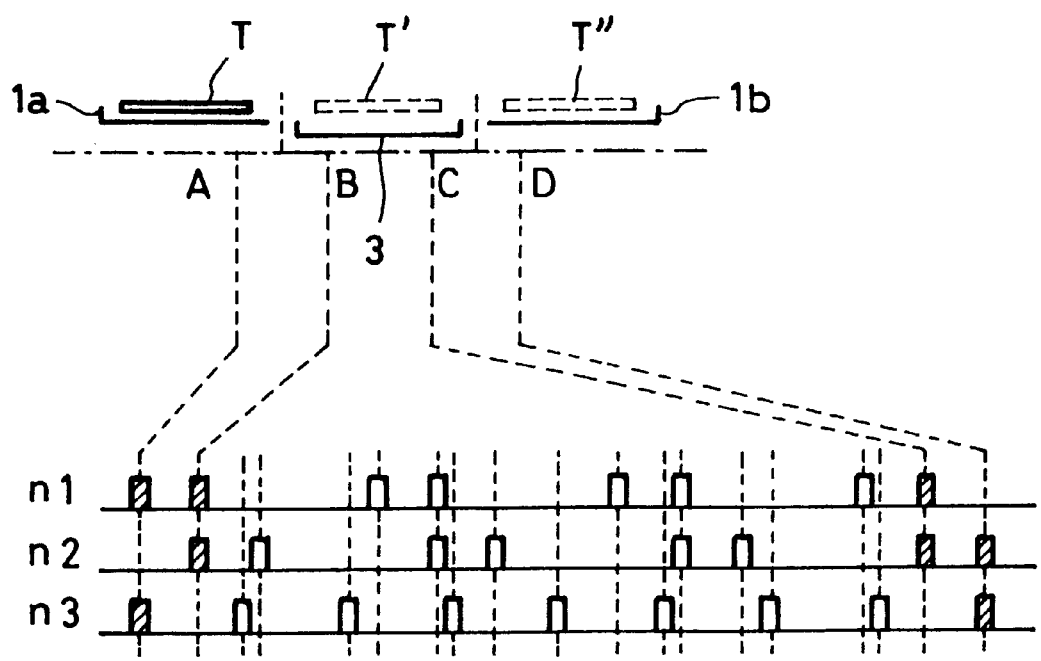
FIG. 5 is a diagram conceptually showing an exemplary combination of slit detection pulse patterns output from individual optical sensors constituting the picker position detector unit.

FIG. 5 shows exemplary slit detection pulse generation patterns in the signals n1, n2 and n3 output from the individual optical sensors N1, N2 and N3. In this illustrated example, points A to D correspond to the predetermined points A to D shown in FIG. 4, and these points A to D can each be detected in absolute form on the basis of a combination of the slit detection pulse generation patterns of the signals n1, n2 and n3. More specifically, because the motor shaft M and drive shaft K rotate at respective predetermined rates, there occurs a difference between the rotating angles of the two shafts M and K, so that a combination of the rotating angle patterns of the individual shafts can correspond to a current absolute position of the locking claw 5. As a consequence, each of the predetermined points A to D of the locking claw 5 can be identified on the basis of a combination of the generation patterns of the rotational position detection pulse signals output from the optical sensors N1 to N3. As seen from FIG. 5, slit detection pulses occur simultaneously in the signals n1 and n3 when the locking claw 5 is at the point A, and slit detection pulses occur simultaneously in the signals n1 and n2 when the locking claw 5 is at the point B. Further, slit detection pulses occur simultaneously in the signals n1 and n2 when the locking claw 5 is at the point C, and slit detection pulses occur simultaneously in the signals n2 and n3 when the locking claw 5 is at the point D. Such slit detection pulses may occur simultaneously when the locking claw 5 is at some other points than the above-mentioned predetermined points A to D; however, whether or not the locking claw 5 is at any one of these predetermined points A to D can be properly determined on the basis of the outputs from the medium detectors 9a and 9b.

Note that FIG. 5 has been described above in relation to the case where the storage units 1a and 1b are disposed to the opposite sides of the carrying holder unit 3.

While the preferred embodiment has been described above as driving the locking claw 5 by a motor-driven endless belt, the locking claw 5 may be driven by any other suitable means such as a gear or lead screw.

Now, a detailed description will be given about positional control of the locking claw 5, with reference to a flow chart of FIG. 6.

Figure 6A:
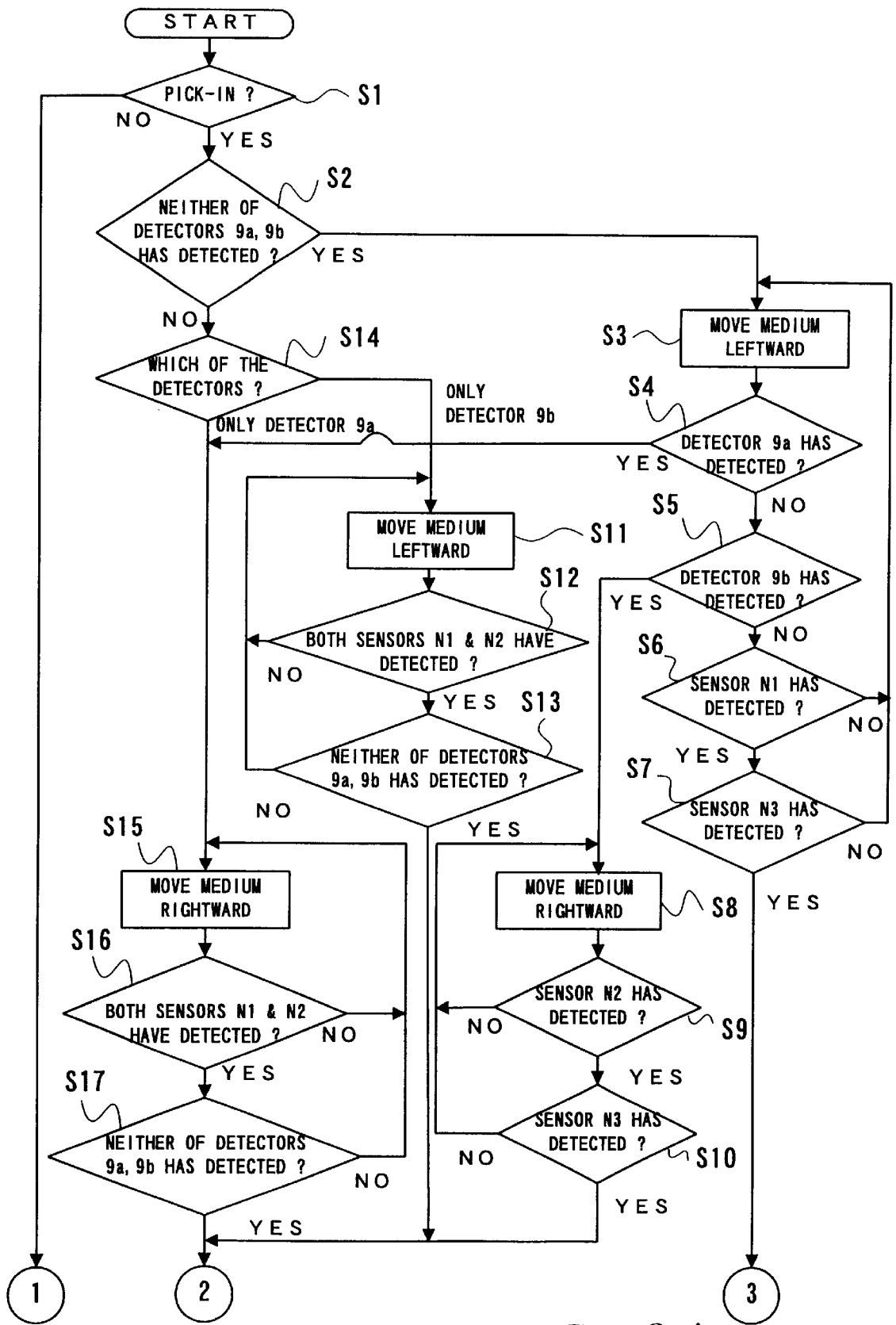
FIGS. 6A is a flow chart showing part of an exemplary step sequence of an positional initialization process that is carried out in the embodiment.
Figure 6B:
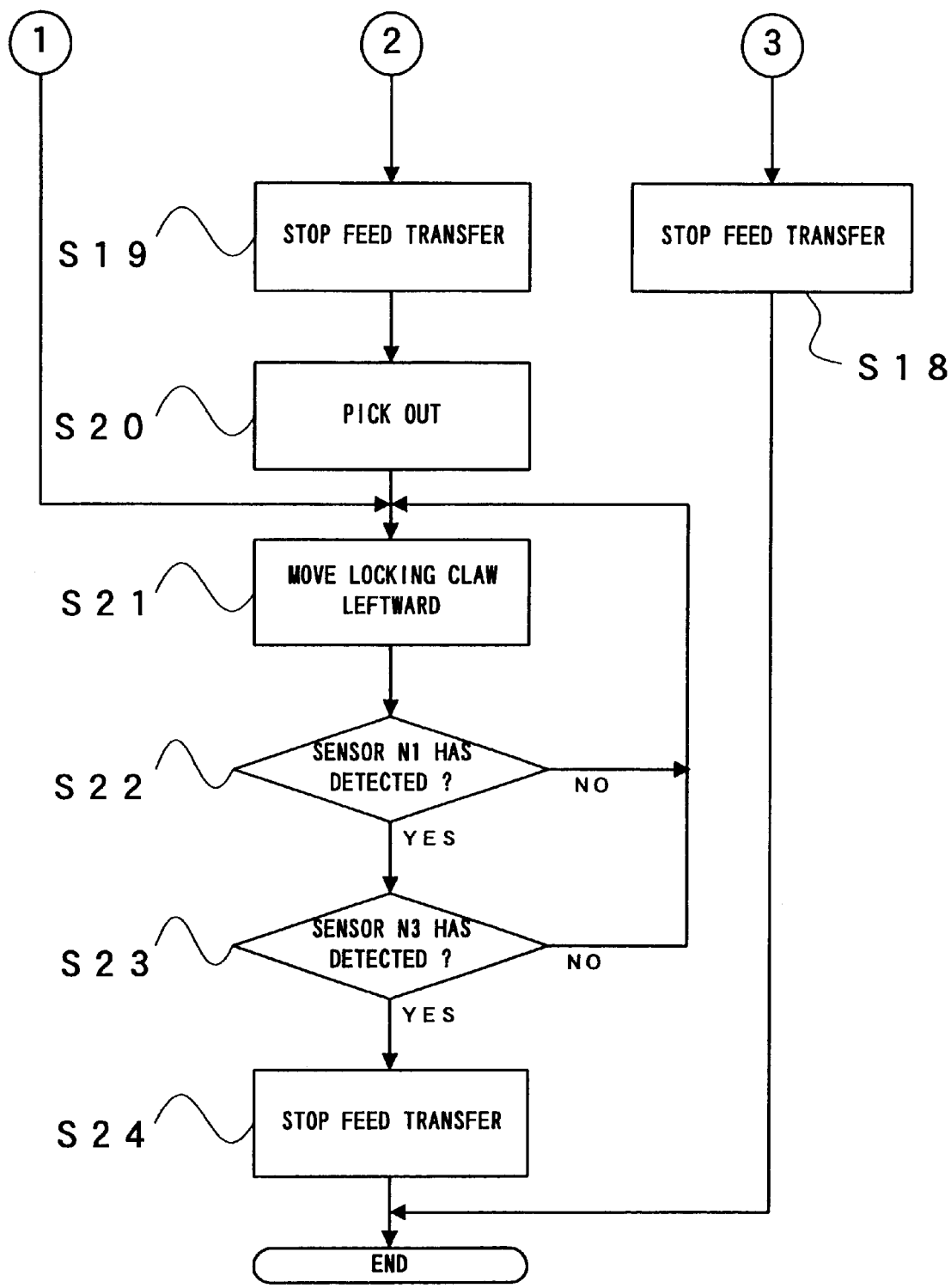
FIGS. 6B is a flow chart showing the remaining part of the positional initialization process.
Figure 7:
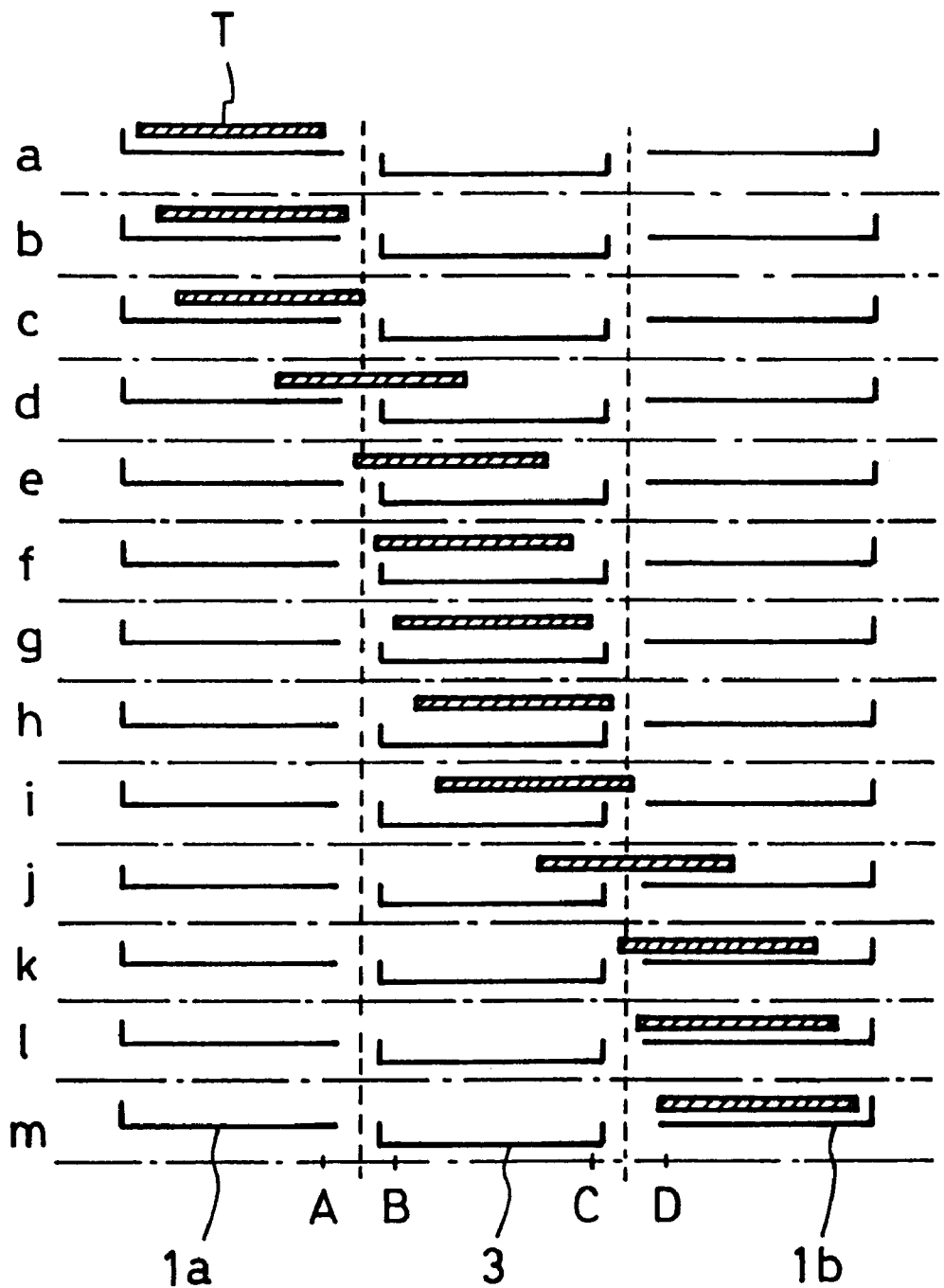
FIG. 7 is a diagram conceptually showing exemplary positional relationship between a storage cell and the carrying holder unit.

FIGS. 6A and 6B show an exemplary step sequence of a medium position initialization process that is carried out by the controller unit 8 upon power-ON, i.e., turning-ON of the power to the library apparatus. This medium position initialization process is directed to first detecting a current position of a recording medium RM and then, on the basis of the thus-detected current position, initializing the position of the recording medium to any one of the above-mentioned first predetermined rest position (i.e., the position denoted by T in FIG. 4 or a position within the storage cell 1a shown in FIG. 5), second predetermined rest position (i.e., the position denoted by T' in FIG. 4 or a position within the carrying holder unit 3 shown in FIG. 5) and third predetermined rest position (i.e., the position denoted by T" in FIG. 4 or a position within the storage cell 1b shown in FIG. 5). Also, in this medium position initialization process, the locking claw 5 is set to a predetermined reference point (point A in this example). In FIG. 7, there are conceptually shown various possible positions which the recording medium takes at power-ON of the library apparatus. For convenience of the following description, the above-mentioned first predetermined rest position will also be called the "position of the storage cell 1a", the second predetermined rest position will also be called the "position of the carrying holder unit 3", and the third predetermined rest position will also be called the "position of the storage cell 1b".

At first step S1 of FIG. 6A, a determination is made as to whether the locking claw 5, at power-ON, is in engagement with a recording medium or in the pick-in position. With an affirmative (YES) answer at step S1, the medium position initialization process is performed at steps S2 to S20, and then the position initialization process for setting the claw 5 to the reference point is performed at and after step S21 of FIG. 6B. If, on the other hand, the locking claw 5 is not in engagement with a recording medium or in the pick-out position as determined at step S1 (NO answer), only the initialization process for setting the claw 5 to the reference point is performed at and after step S21, without carrying out the medium position initialization process of steps S2 to S20.

In the case where the power was shut off during the course of handling a recording medium by means of the holder unit 3, the locking claw 5 is still kept in the engagement with the recording medium at the time of following power-ON or resumption of the power. If any other recording medium is stored in the same storage cell 1a corresponding in position to the reference point (point A) when the locking claw 5 is initialized to the reference point (point A) upon resumption of the power, then the recording medium engaged by the locking claw 5 will collide against the stored recording medium as the claw 5 is moved toward the reference point, thereby preventing the claw 5 from moving further. The operational sequence of FIG. 6 is designed to avoid such an inconvenience; that is, as noted above, the determination is made at step S1 as to whether the locking claw 5, at power-ON, is in engagement with a recording medium, and if so, control is performed such that the recording medium engaged by the claw 5 is moved and settled in any one of the first to third predetermined rest positions.

More specifically, in the medium position initialization process, it is determined at step S2 whether the medium detector 9a or 9b (FIG. 1) is detecting any recording medium engaged by the locking claw 5. That is, step S2 determines whether every recording medium is being stored in the storage cell 1a or 1b or carrying holder unit 3 substantially completely (i.e., at any one of positions denoted by "a", "b", "f" to "h", "l" and "m" in FIG. 7) or any recording medium is not in the substantially completely stored position, i.e., projecting out of the storage cell 1a or 1b or carrying holder unit 3 (i.e., at any one of positions denoted by "c" to "e" and "i" to "k" in FIG. 7). If no recording medium engaged by the locking claw has not been detected at power-ON as determined at step S2 (YES answer), it means that every recording medium is being properly stored in the storage cell 1a (as denoted by "a" or "b" in FIG. 7) or storage cell 1b (as denoted by "l" or "m" in FIG. 7) or in the carrying holder unit 3 (as denoted by "f"–"h" in FIG. 7) rather than being pending or unsettled between the storage cell 1a or 1b and the carrying holder unit 3. However, in this case, it is not possible to determine in which of the storage cells 1a and 1b and carrying holder unit 3 the recording medium is being stored; thus, the locking claw 5 is temporarily moved leftward at step S3, as noted earlier, to permit such a determination.

At next step S4, it is determined whether the detector 9a has detected the recording medium as the locking claw 5 is moved leftward. If answered in the affirmative at step S4, then the operations of steps S15 to S17 are carried out. If the detector 9a has not detected any recording medium as determined at step S4, then step S5 is taken for determining whether the other detector 9b has detected the recording medium as the locking claw 5 is moved leftward. If answered in the affirmative at step S5, then the operations of steps S8 to S10 are carried out. If the detector 9b has not detected the recording medium as determined at step S5, the operations of steps S6 and S7 are carried out.

Namely, if the detector 9a has detected the recording medium as determined at step S4 as a result of the temporary leftward movement of the locking claw 5 at step S3, it means that the recording medium, at power-ON, is in any of the "f" to "h" positions of FIG. 7, i.e., being stored in the carrying holder unit 3. If the other detector 9b has detected the recording medium as determined at step S5 as a result of the leftward movement of the locking claw 5, it means that the recording medium, at power-ON, is in the "l" or "m" positions of FIG. 7, i.e., being stored in the storage cell 1b.

In case neither of the detectors 9a and 9b has detected any recording medium (i.e., if a negative determination is made at both steps S4 and S5), it means that the recording medium, at power-ON, is in the "a" or "b" positions of FIG. 7, i.e., being stored in the storage cell 1a.

If any recording medium engaged by the locking claw 5 has been detected by the detector 9a or 9b (NO determination at step S2), a further determination is made at step at step S14 as to which of the detectors has detected the recording medium.

In this case, the NO determination at step S2 means that the recording medium, at power-ON, is pending or unsettled between the storage cell 1a and the carrying holder unit 3 or between the storage cell 1c and the carrying holder unit 3. If the recording medium is in any one of the "c" to "e" positions of FIG. 7 (i.e., part of the medium lies halfway between the storage cell 1a and the carrying holder unit 3), step S14 determines that the detector 9a has detected the recording medium and then step S15 is taken. If the recording medium is in any one of the "i" to "k" positions of FIG. 7 (i.e., part of the medium lies halfway between the storage cell 1b and the carrying holder unit 3), step S14 determines that the other detector 9b has detected the recording medium and then step S11 is taken.

The above-mentioned operations can thus indirectly determine a current position of the recording medium at the time of power-ON of the library apparatus. Thereafter, on the basis of the thus-determined position of the recording medium, the process is carried out for feed-transferring the recording medium to any one of the first to third predetermined rest positions. This feed transfer is effected by positioning the locking claw 5 at one of the points A to D of FIG. 4 or 5 corresponding to these predetermined rest positions.

At step S6, it is determined whether the optical sensor N1 has generated a slit detection pulse n1. At next step S7, it is determined whether the optical sensor N3 has generated a slit detection pulse n3. If a negative (NO) determination results at step S6 or S7, the routine loops back to step S3 in order to perform the operations at and after step S3, so that the leftward feed transfer of the recording medium continues. Once an affirmative (YES) determination results at both steps S6 and S7, the routine moves on to step S18 of FIG. 6B in order to stop the feed transfer. If the two optical sensors have thus simultaneously generated the slit detection pulses n1 and n3, it means that the locking claw 5 is being positioned at the predetermined reference point (point A) and the recording medium is being completely stored in the storage 1a, i.e., in the first predetermined rest position.

At step S8 taken in response to the determination of step S5 that the detector 9b has detected the recording medium, the recording medium is moved or fed rightward. At next step S9, it is determined whether the optical sensor N2 has generated a slit detection pulse n2. At following step S10, it is determined whether the optical sensor N3 has generated a slit detection pulse n3. If a negative (NO) determination results at step S9 or S10, the routine loops back to step S8 to perform the operations at and after step S8, so that the rightward feed transfer of the recording medium continues. Once an affirmative (YES) determination results at both steps S9 and S10, the routine moves on to step S19 of FIG. 6B in order to stop the feed transfer. If the two optical sensors have thus simultaneously generated the slit detection pulses n2 and n3, it means that the locking claw 5 is being positioned at one of the predetermined points (point D) and the recording medium is being completely stored in the storage 1b, i.e., in the third predetermined rest position.

At step S11 taken in response to the determination of step S14 that only the detector 9b has detected the recording medium, the recording medium is moved or fed leftward. At next step S12, it is determined whether the optical sensors N1 and N2 have simultaneously generated respective slit detection pulses n1 and n2. At following step S13, it is determined whether neither of the medium detectors 9a and 9b has detected the recording medium. If a negative (NO) determination results at step S12 or S13, the routine loops back to step S11 to perform the operations at and after step S11, so that the leftward feed transfer of the recording medium continues. Once an affirmative (YES) determination results at both steps S12 and S13, the routine moves on to step S19 of FIG. 6B in order to stop the feed transfer. By such a leftward feed transfer from any one of the "i" to "k" positions of FIG. 7, the recording medium is passed to the carrying holder unit 3. If the slit detection pulses n1 and n2 have been simultaneously generated (YES determination at step S12) during the leftward feed and both the detectors 9a and 9b no longer detect the recording medium, this means that the locking claw 5 has now been positioned at one of the predetermined points (point B) and the recording medium has been completely stored in the carrying holder unit 3 (i.e., in the second predetermined rest position).

At step S15 taken in response to the determination of step S14 that only the detector 9a has detected the recording medium, the recording medium is moved or fed rightward. At next step S16, it is determined whether the optical sensors N1 and N2 have simultaneously generated respective slit detection pulses n1 and n2. At following step S17, it is determined whether neither of the detectors 9a and 9b has detected the recording medium. If a negative (NO) determination results at step S16 or S17, the routine loops back to step S15 to perform the operations at and after step S15, so that the rightward feed transfer of the recording medium continues. Once an affirmative (YES) determination results at both steps S16 and S17, the routine moves on to step S19 of FIG. 6B in order to stop the feed transfer. By such a rightward feed transfer from any one of the "c" to "e" positions of FIG. 7, the recording medium is passed to the carrying holder unit 3. If the slit detection pulses n1 and n2 have been simultaneously generated (YES determination at step S16) during the rightward feed and both the detectors 9a and 9b no longer detect the recording medium (YES determination at step S17), this means that the locking claw 5 has now been positioned at one of the predetermined points (point C) and the recording medium has been completely stored in the carrying holder unit 3 (i.e., in the third predetermined rest position).

Then, at step S20 of FIG. 6B, the locking claw 5 is retracted out of the engagement with the recording medium, i.e., back to the pick-out position. At following step S21, the locking claw 5 is moved leftward. At next step S22, it is determined whether the optical sensor N1 has generated a slit detection pulse n1. Then, at next step S23, it is determined whether the optical sensor N3 has generated a slit detection pulse n3. If a negative (NO) determination results at step S22 or S23, the routine loops back to step S21 to perform the operations at and after step S21, so that the leftward movement of the recording medium continues. Once an affirmative (YES) determination results at both steps S22 and S23, the routine moves on to step S24 in order to stop the locking claw movement and thereby terminate the current process. If the slit detection pulses n1 and n3 have been simultaneously generated in response to the movement of the locking claw 5, this means that the locking claw 5 has been positioned at the predetermined reference point (point A).

When the recording medium is completely stored in the storage cell 1a (i.e., in the first predetermined rest position) and thus an affirmative determination is made at both steps S6 and S7, this routine may be terminated without performing the operations of steps S20 to S24 because the locking claw 5 is already positioned at the predetermined reference point (point A). Note that the initial reference point of the locking claw 5 may be other than the point A.

While the embodiment has been described in relation to the case where the first predetermined rest position defined for positioning the recording medium is the position of the storage cell 1a and the third predetermined rest position is the position of the storage cell 1b, these rest positions may be the position of the medium drive unit 2 or that of a medium inlet port (not shown) through which the recording medium is introduced from outside the library apparatus. Further, the principles of the present invention may of course be applied to recording media library apparatuses of another type where the storage unit 1 and drive unit 2 are disposed to only one side, rather than two opposite sides, of the carrying holder unit 3.

Furthermore, while the preferred embodiment has been described above as performing the medium position initialization process only upon power-ON, such a medium position initialization process may be executed at any other suitable time.

Moreover, although the picker position detector unit 10 in the described embodiment comprises optical sensors, it may comprise any other suitable sensors, such as conventional absolute sensors.

In summary, the present invention is characterized in that control is performed for indirectly determining a current position of a recording medium on the basis of a detected position of the locking member. This arrangement eliminates a need to provide a picker position detector dedicated to directly detecting a position of the recording medium within a predetermined travel range and can simplify the structure of the recording media library apparatus accordingly. As a result, the recording media library apparatus can be manufactured in smaller size and at lower cost.

Further, the present invention is characterized in that a process is performed, at power-ON of the library apparatus, for first identifying a position of any recording medium that was being transferred at the time of last power-OFF of the library apparatus and having been left pending since then, and then settling the pending recording medium in one of predetermined positions. With this characteristic arrangement, even when the power was shut off during the course of a feed transfer of a recording medium, the library apparatus can appropriately start operating immediately upon power-ON, and thus the library apparatus can always be used with increased efficiency.

In addition, whenever at least part of a recording medium is received in the carrier unit at turning-ON of the power, this pending recording medium is first fed to the carrier unit during an initialization stage such that it is positioned completely within the carrier unit. This arrangement can effectively reduce the likelihood of the library apparatus being damaged by such a pending recording medium.

What is claimed is:

1. A recording media library apparatus comprising:
    a storage section that stores a recording medium;
    a carrier unit that carries a recording medium;
    a drive unit that reads or writes data on a recording medium;
    a medium transfer mechanism that includes a locking member engageable with a recording medium and moves the recording medium within a predetermined travel range with the recording medium engaged by said locking member, to thereby allow the recording medium to be transferred between said carrier unit and said storage section or said drive unit;
    a position detector unit that detects a current position of said locking member to determine which of a plurality of predetermined points within the travel range the current position of said locking member corresponds to;
    a sensor adapted to detect any recording medium pending at or beyond a particular position between said carrier unit and said storage section or said drive unit due to transfer between said carrier unit and said storage section or said drive unit; and
    a controller unit adapted to determine whether or not said locking member is engaging the recording medium, irrespective of where within the predetermined travel range said locking member is currently located, said controller unit further adapted to determine a current position of said recording medium within the travel range on the basis of an output of said position detector unit and an output of said sensor, and control transfer of the recording medium by said medium transfer mechanism on the basis of the determined current position of the recording medium, wherein when said controller unit has determined, upon power-on, that said locking member is engaging the recording medium, said controller unit determines a current position of the recording medium within the travel range on the basis of a detection output of said position detector unit and an output of said sensor performs initialization control for causing said medium transfer mechanism to move the recording medium, in accordance with the determined current position, to thereby stop the recording medium at a predetermined position, while when said controller unit has determined, upon power-on, that said locking member is not engaging the recording medium, said controller unit omits initialization control.

2. A recording media library apparatus as recited in claim 1 wherein said controller unit controls transfer of the recording medium transfer mechanism on the basis of the output of said position detector unit and the output of said sensor, to allow the recording medium to be settled in a predetermined rest position.

3. A recording media library apparatus as recited in claim 1 wherein the predetermined rest position is where the recording medium is completely stored in any one of said carrier unit, storage section and drive unit.

4. A recording media library apparatus as recited in claim 1 wherein said position detector unit is provided in association with a drive shaft for said locking member of said medium transfer mechanism, and said position detector unit includes at least one transmission shaft to which rotational force of said drive shaft is transmitted at a predetermined transmission ratio, and a plurality of sensor sections provided in corresponding relation to at least said drive shaft and said transmission shaft, each of said sensor sections generating a rotational position detection signal corresponding to at least one predetermined rotational angle of a corresponding one of said shafts while the corresponding shaft is rotating, and wherein said position detector unit detects said plurality of predetermined points in absolute form on the basis of a combination of generation patterns of the rotational position detection signals generated by said sensor sections.

5. A recording media library apparatus as recited in claim 1 wherein said recording medium is transferred by said medium transfer mechanism to or from said carrier unit and transported by said carrier unit, along with a predetermined mount supporting thereon said recording medium.

* * * * *